United States Patent [19]

Bartels

[11] Patent Number: 5,126,503

[45] Date of Patent: * Jun. 30, 1992

[54] MEMBRANE PROCESS FOR DEWATERING LUBE OIL DEWAXING SOLVENTS

[75] Inventor: Craig R. Bartels, Wappingers Falls

[73] Assignee: Texaco Inc., White Plains, N.Y.

[*] Notice: The portion of the term of this patent subsequent to Feb. 12, 2008 has been disclaimed.

[21] Appl. No.: 563,018

[22] Filed: Aug. 6, 1990

[51] Int. Cl.⁵ .............................................. C07C 7/144
[52] U.S. Cl. .................................... 585/818; 208/187; 210/500.37; 210/640; 210/654
[58] Field of Search ........... 585/818; 210/640, 500.37, 210/654; 208/147

[56] References Cited

U.S. PATENT DOCUMENTS 4,992,176  2/1991  Bartels .............................. 210/654

OTHER PUBLICATIONS

Nebergall et al., "General Chemistry" 4th edition, 1972, pp. 498-502.

Primary Examiner—Theodore Morris
Assistant Examiner—William C. Diemler
Attorney, Agent, or Firm—Robert A. Kulason; James J. O'Loughlin; Carl G. Seutter

[57] ABSTRACT

Water is separated from an MEK toluene dewaxing solvent by pervaporation through a poly(vinyl pyridine) membrane which has been cross-linked with 1,4-dibromobutane mounted on a polyacrylonitrile support layer.

14 Claims, No Drawings

MEMBRANE PROCESS FOR DEWATERING LUBE OIL DEWAXING SOLVENTS

FIELD OF THE INVENTION

This invention relates to solvent dewaxing. More particularly it relates to a process for removing water from a mixture of hydrocarbon and organic oxygenate—such as the toluene-methyl ethyl ketone solvent used in MEK dewaxing of hydrocarbon lubricating oils.

BACKGROUND OF THE INVENTION

As is well known to those skilled in the art, it is possible to remove water from mixtures thereof with organic liquids by various techniques including adsorption or distillation. These conventional processes, particularly distillation, are however, characterized by high capital cost. In the case of distillation for example the process requires expensive distillation towers, heaters, heat exchangers (reboilers, condensers, etc.), together with a substantial amount of auxiliary equipment typified by pumps, collection vessels, vacuum generating equipment, etc.

Such operations are characterized by high operating costs principally costs of heating and cooling—plus pumping, etc.

Furthermore the properties of the materials being separated, as is evidenced by the distillation curves, may be such that a large number of plates may be required, etc. When the material forms an azeotrope with water, additional problems may be present which for example, could require that separation be effected in a series of steps (e.g. as in two towers) or by addition of extraneous materials to the system.

There are also comparable problems which are unique to adsorption systems.

It has been found to be possible to utilize membrane systems to separate mixtures of liquids by pervaporation. In this process, the charge liquid is brought into contact with a membrane film; and one component of the charge liquid preferentially permeates the membrane. The permeate is then removed as a vapor from the downstream side of the film—typically by sweeping with a carrier gas or by reducing the pressure below the vapor pressure of the permeating species.

Illustrative membranes which have been employed in prior art techniques include those set forth in the following table:

TABLE

| Separating Layer | References |
| --- | --- |
| Cross-linked polyvinyl alcohol | Eur. Patent 0 096 339 to GFT as assignee of Bruschke |
| Cellulose triacetate | Wentzlaff, Boddeker & Hattanback J. Mem Sci 22, 333 (1985) |
| Polyacrylonitrile | Neel, Aptel, & Clement Desalination 53,297 (1985) |
| Poly (maleimide-acrylonitrile) | Yoshikawa et al J. Pol. Sci. 22,2159 (1984) |

The cost effectiveness of a membrane is determined by the selectivity and productivity. Of the membranes commercially available, an illustrative membrane of high performance is that disclosed in European Patent 0 096 339 A2 of GFT as assignee of Bruschke—published Dec. 31, 1983.

European Patent 0 096 339 A2 to GFT as assignee of Bruschke discloses, as cross-linking agents, diacids (typified by maleic acid or fumaric acid); dihalogen compounds (typified by dichloroacetone or 1,3-dichloroisopropanol); aldehydes, including dialdehydes, typified by formaldehyde. These membranes are said to be particularly effective for dehydration of aqueous solutions of ethanol or isopropanol.

This reference discloses separation of water from alcohols, ethers, ketones, aldehydes, or acids by use of composite membranes. Specifically the composite includes (i) a backing, typically about 120 microns in thickness, on which is positioned (ii) a microporous support layer of a polysulfone or a polyacrylonitrile of about 50 microns thickness, on which is positioned (iii) a separating layer of cross-linked polyvinyl alcohol about 2 microns in thickness.

Polyvinyl alcohol may be cross-linked by use of difunctional agents which react with the hydroxyl group of the polyvinyl alcohol. Typical cross-linking agent may include dialdehydes (which yield acetal linkages), diacids or diacid halides (which yield ester linkages), dihalogen compounds or epichlorhydrin (which yield ether linkages), olefinic aldehydes (which yield ether/acetal linkages), boric acid (which yield boric ester linkages), sulfonamidoaldehydes, etc.

See also J.G. Prichard *Polyvinyl Alcohol, Basic Properties and Uses* Gordon and Breach Science Publishers, New York (1970) or C.A. Finch *Polyvinyl Alcohol, Properties and Applications* John Wiley and Sons, New York (1973).

It is an object of this invention to provide a novel process for separation of water from mixtures of hydrocarbon and organic oxygenate—typified by a mixture of toluene and methyl ethyl ketone. Other objects will be apparent to those skilled in the art.

STATEMENT OF THE INVENTION

In accordance with certain of its aspects, this invention is directed to the method of separating water from a charge aqueous mixture of hydrocarbon and organic oxygenate which comprises maintaining a non-porous membrane separating layer of a poly(vinyl pyridine) which has been cross-linked with an aliphatic polyhalide;

maintaining a pressure drop across said non-porous separating layer;

passing a charge water-containing mixture of hydrocarbon and organic oxygenate into contact with the high pressure side of said non-porous separating layer whereby at least a portion of said water in said charge aqueous mixture and a lesser portion of hydrocarbon and organic oxygenate pass by pervaporation through said non-porous separating layer as a lean mixture containing more water and less hydrocarbon and organic oxygenate than are present in said charge aqueous mixture and said charge aqueous mixture is converted to a rich liquid containing less water and more hydrocarbon and organic oxygenate than are present in said charge aqueous mixture;

recovering from the low pressure side of said non-porous separating layer said lean mixture containing more water and less hydrocarbon and organic oxygenate than are present in said charge aqueous mixture, said lean mixture being recovered in vapor phase at a pressure below the vapor pressure thereof; and recovering from the high pressure side of said non-porous separating layer said rich liquid containing a lower water content and a higher hydrocarbon and organic oxygenate content than are present in said charge aqueous mixture.

DESCRIPTION OF THE INVENTION

The composite structure of this invention preferably includes a multi-layer assembly which in the preferred embodiment preferably includes a porous carrier layer which provides mechanical strength and support to the assembly. Clearly each of the components of the composite will be inert to the liquids with which they came into contact.

THE CARRIER LAYER

This porous carrier layer, when used, is characterized by its high degree of porosity and mechanical strength. It may be fibrous or non-fibrous, woven or non-woven. In the preferred embodiment, the carrier layer may be a porous, flexible, non-woven fibrous polyester.

A typically non-woven, thermally-bonded polyester carrier layer may be formulated of non-woven thermally bonded strands and characterized by a fabric weight of 80±8 grams per square yard, a thickness of 4.2±0.5 mils, a tensile strength (in the machine direction) of 31 psi and (in cross direction) of 10 psi, and a Frazier air permeability of 6 cuft/min/sq. ft. @ 0.5 inches of water.

THE POROUS SUPPORT LAYER

The porous support layer of this invention may be formed of a sheet of polymer membrane which is essentially inert with respect to (e.g. insoluble in) the hydrocarbon and the organic oxygenate which are used in practice of the process of this invention. The porous support layer may preferably be a membrane of polyacrylonitrile polymer. Typically the polyacrylonitrile may be of thickness of 40-80 microns, say 50 microns. The polyacrylonitrile is preferably characterized by a molecular weight cut-off of about 20,000-40,000.

The acrylonitrile polymers which may be employed may include those having repeating units of the formula:

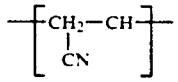

THE SEPARATING LAYER

The separating layer which permits attainment of the separation in accordance with this invention may include a non-porous film of cross-linked poly(vinyl pyridine) of thickness of about 1-10 microns, preferably 1-5 microns, say 3 microns. The layer is formed preferably by casting from a poly(4-vinyl pyridine)—typically the Reilline 4200 brand (of Reilly Tar and Chemical Co.) of poly-(4-vinyl pyridine) in a 10 w% solution in a suitable solvent such as an alcohol, typically methanol.

The membrane may be typically formed by mixing 0.5-2 parts, say 1 part of 10%-30%, say 20 w% solution of poly(4-vinyl pyridine) in methanol with 1 part n-butanol and 0.1-0.8 parts, say 0.52 parts, parts of aliphatic polyhalide cross-linking agent.

It is a feature of this invention that the separating layer may be a homopolymer or a copolymer of 2-vinyl pyridine or 4-vinyl pyridine. When copolymers are employed, the co-monomer may be an ethlenically unsaturated monomer, typically vinyl chloride, ethylene, vinyl acetate, styrene, vinyl acetate, vinyl alcohol, acrylonitrile, or ethylene oxide, etc. In the preferred embodiment, the separating layer is a homopolymer of 4-vinyl pyridine of molecular weight $\overline{M}_n$ of 10,000-500,000, preferably 100,000-300,000, say about 200,000.

The formed polymer membrane may be cross-linked with an aliphatic polyhalide cross-linking agent to form the membranes useful in practice of this invention.

Typically the cross-linking agent may contain an aliphatic moiety, preferably containing 2-12 carbon atoms, typically 3-6 carbon atoms, say 4 carbon atoms. Although the cross-linking agent may be a polyhalide, it typically contains 2-5 halogen atoms, most preferably 2. The halogen is preferably bromine or less preferably chlorine or iodine. The halides may preferably be alpha, omega dihalides of linear straight chain aliphatic hydrocarbon. Typical cross-linking agents may be as tabulated infra, the first listed being preferred:

| TABLE |
|---|
| 1,4-dibromo-n-butane |
| 1,5-dibromo-n-pentane |
| 1,10-dibromo-decane |
| 1,4-dichloro-n-butane |
| 1,3-dibromo-n-pentane |
| 1,6-dibromo-n-hexane |
| 1,8-dibromo-octane |

In situ cross-linking may be carried out by casting onto the preferred polyacrylonitrile support the poly(4-vinyl pyridine) typically in a 10 w% solution in methanol to which is added the cross-linking agent (typically 1,4-dibromobutane) in mole ratio of cross-linking agent to polymer repeat unit of 0.2-2, say about 1.13.

It may be possible in one embodiment to cross-link the poly(4-vinyl pyridine) separating layer in one step by adding the polyhalide to the solution of poly(4-vinyl pyridine) and casting, followed by heat curing.

In another embodiment, it may be possible to apply to the porous support layer, a solution of poly(4-vinyl pyridine) in an alcohol solvent. This may be dried at 40°-80° C., say 50° C. for 2-10 minutes, say 4 minutes to form a film. The polyvinyl pyridine may then be cross-linked by soaking the film in an alcohol solution containing 1-50%, say 10% of a polyhalide cross-linking agent.

The composite membrane, whether prepared by the one-step or the two-step process may be cured in an oven at 100° C.-200° C., say 125° C. for 1-30 minutes, say 2 minutes to yield a polyvinyl alcohol film having a thickness of 1-10 microns, say 4 microns.

THE COMPOSITE MEMBRANE

It is a feature of this invention that the composite membrane of this invention may comprise (i) an optional carrier layer, characterized by porosity and mechanical strength, for supporting a porous support layer and a separating layer, (ii) a porous support layer of preferably polyacrylonitrile of molecular weight of 5,000-100,000, of thickness of 10-80 microns, and of molecular weight $\overline{M}_n$ cut off of 20,000-200,000 and (iii) as a non-porous separating layer of poly(vinyl pyridine) of molecular weight of 10,000-500,000 which has been cross-linked with an aliphatic polyhalide.

The composite membranes of this invention may be utilized in various configurations. It is, for example, possible to utilize the composite in a plate-and-frame configuration in which separating layers may be mounted on the porous support layer with the carrier layer.

It is possible to utilize a spiral wound module which includes a non-porous separating layer membrane mounted on a porous support layer and a carrier layer, the assembly being typically folded and bonded or sealed along all the edges but an open edge—to form a bag-like unit which preferably has the separating layer on the outside. A cloth spacer, serving as the permeate or discharge channel is placed within the bag-like unit. The discharge channel projects from the open end of the unit.

There is then placed on one face of the bag-like unit, adjacent to the separating layer, and coterminous therewith, a feed channel sheet—typically formed of a plastic net.

The so-formed assembly is wrapped around a preferably cylindrical conduit which bears a plurality of perforations in the wall—preferably in a linear array which is as long as the width of the bag-like unit. The projecting portion of the discharge channel of the bag-like unit is placed over the perforations of the conduit; and the bag-like unit is wrapped around the conduit to form a spiral wound configuration.

It will be apparent that, although only one feed channel is present, the single feed channel in the wound assembly will be adjacent to two faces of the membrane layer. The spiral wound configuration may be formed by wrapping the assembly around the conduit a plurality of times to form a readily handleable unit. The unit is fitted within a shell (in manner comparable to a shell-and-tube heat exchanger) provided with an inlet at one end and an outlet at the other. A baffle-like seal between the inner surface of the shell and the outer surface of the spiral-wound input prevents fluid from bypassing the operative membrane system and ensures that fluid enters the system principally at one end. The charge passes from the feed channel, into contact with the separating layer and thence therethrough, into the permeate channel and thence therealong to and through the perforations in the conduit through which it is withdrawn as net permeate.

In use of the spiral wound membrane, charge liquid is permitted to pass through the plastic net which serves as a feed channel and thence into contact with the non-porous separating membranes. The liquid which does not pass through the membranes is withdrawn as retentate. The liquid or vapor which permeates the membrane passes into the volume occupied by the permeate spacer and through this permeate channel to the perforations in the cylindrical conduit through which it is withdrawn from the system.

In another embodiment, it is possible to utilize the system of this invention as a tubular or hollow fibre. In this embodiment, the porous support layer of e.g. polyacrylonitrile may be extruded as a fine tube with a wall thickness of typically 0.001-0.1 mm. The extruded tubes are passed through a bath of poly(vinyl pyridine) which is cross-linked and cured in situ. A bundle of these tubes is secured (with an epoxy adhesive) at each end in a header; and the fibres are cut so that they are flush with the ends of the header. This tube bundle is mounted within a shell in a typical shell-and-tube assembly.

In operation, the charge liquid is admitted to the tube side and passes through the inside of the tubes and exits as retentate. During passage through the tubes, permeate passes through the non-porous separating layer and permeate is collected in the shell side.

In this embodiment, it will be apparent that the system may not normally include a carrier layer. In still another embodiment, the porous support layer may be omitted; and the separating layer is extruded and thereafter cross-linked and cured in situ prior to mounting in the headers.

It is a feature of this invention that the novel membrane may be particularly useful in a pervaporation process for removing water from mixtures of hydrocarbons and organic oxygenates—such as the toluene-methyl ethyl ketone solvent used in MEK dewaxing of hydrocarbon oils.

These mixtures may commonly contain small quantities of immiscible water—typically up to 3-5w% which may be derived from various sources. In the case of MEK dewaxing, it may be introduced as by contact with stripping steam etc.

Illustrative charge systems (which contain water) may include the following:

TABLE

| | |
|---|---|
| (i) | methyl ethyl ketone MEK |
| | toluene |
| (ii) | methyl isobutyl ketone MIBK |
| | toluene |
| (iii) | methyl ethyl ketone MIBK |
| | methyl isobutyl ketone MIBK |
| | toluene |
| (iv) | methyl ethyl ketone MEK |
| | toluene |
| | benzene |
| (v) | methyl ethyl ketone MEK |
| | benzene |
| (vi) | acetone |
| | toluene |
| (vii) | acetone |
| | gasoline |
| (viii) | acetone |
| | heptane |
| (vix) | ethanol |
| | gasoline |
| (x) | methanol |
| | gasoline |
| (xi) | methanol |
| | ethanol |
| | gasoline |
| (xii) | ethyl acetate |
| | xylene |

It is a feature of the process of this invention that it may be employed to dewater dewaxing solvents typified by that containing methyl ethyl ketone and toluene, in weight ratio of about 2:1 which has picked up as much as 5 w% water.

In practice of the pervaporation process of this invention, the charge solution at 40° C.-120° C., say 80° C. may be passed into contact with the non-porous separating layer of the membrane of this invention. A pressure drop of about one atmosphere is commonly maintained across the membrane. Typically, the feed or charge side of the membrane is at about atmospheric pressure and the permeate or discharge side of the membrane is at a pressure of about 1-20 preferably 1-10, say 2 mm.Hg.

The permeate which passes through the membrane includes water and a small proportion of the other components of the charge liquid. Typically, the permeate contains 90-99.9, say 99 w% water. Permeate is recovered in vapor phase.

Pervaporation may typically be carried out at a flux of 0.01-3, say 0.50 gallons per square foot per day which corresponds to about 0.017-5.1, say 0.85 kilograms per square meter per hour (kmh). Typically, the units may have a selectivity (measured in terms of w% water in the permeate) of 96-99.9%, say 99.8%.

The Separation Factor S or Sep which represents the ability of the membrane to separate water is calculated as follows:

$$S = \frac{\left(\frac{X_n}{X_m}\right)_p}{\left(\frac{X_n}{X_m}\right)_f}$$

wherein $X_n$ and $X_m$ are the weight fractions of water and non-aqueous components respectively in the permeate (P) and the feed (F). A system showing no separation at all would have a Separation Factor of 1; and a system showing perfect 100% separation would have a Separation Factor of infinity. The process of the instant invention may commonly have a Separation Factor of about 1000-70,000, typically 7000-61,000, say about 42,000. Satisfactory operation appears to require a Separation Factor of at least about 1000 although good commercial practice would require Separation Factors about 7000 or above. The process of this invention typically yields Separation Factors which are greater than this.

Practice of the process of this invention will be apparent to those skilled in the art from inspection of the following examples wherein, as elsewhere in this specification, all parts are parts by weight unless otherwise stated

DESCRIPTION OF SPECIFIC EMBODIMENTS

EXAMPLE 1

In this example, which represents the best mode presently known of carrying out the process of this invention, the selective separating layer is mounted on the porous support layer of a commercially available (under the trademark DUY-L, from Daicel Corp) composite containing a woven polyester backing as carrier layer, bearing as porous support layer, a microporous polyacrylonitrile layer of molecular weight cut-off of 40,000.

The separating layer is formed by applying to the porous support layer, a solution containing 40% of the Reilline 4200 (available from Reilly Chemical Co.) product (20w% solution of poly(4-vinyl pyridine) in methanol) plus 40 w% n-butanol plus 20 w% 1,4-dibromobutane. Mole ratio of cross-linking agent to polymer is 1.13. The coated support is placed in an oven at 125° C. for 2 minutes to dry and cure the film.

The membrane made by this method is evaluated in a pervaporation cell to which the charge is admitted at 50° C. Permeate pressure is 8 torr at liquid nitrogen temperature.

In this preferred embodiment, the charge contains 64 w% methyl ethyl ketone, 35 w% toluene and 1 w% water at 50° C. The permeate flux is 1.27 kmh and contains 98 w% water, 1.9 w% methyl ethyl ketone, and 0.1 w% toluene which represents a Separation Factor of 4850. This is outstanding.

EXAMPLES II-IX

In this series of Examples, the procedure of Example I is followed except:

(i) the poly(4-vinyl pyridine) solution is 20 w% in methanol, diluted to a 10 w% concentration, yielding a wet 3 mil coating;

(ii) the membrane of Examples II*-III* are control membranes—no cross-linking agent is employed;

(iii) the mole ratio of cross-linking agent to polymer is 0.57 in Examples IV, VI, and VIII;

(iv) the membrane of Control Example II* is air-dried at ambient temperature;

(v) the runs are carried out at 50° C.;

(vi) the feed contains methyl ethyl ketone and toluene in weight ratio of 2:1; and (vii) the feed contained 1.41 w% water in Examples II-V, 0.97 w% water in Examples VI-VII and 0.69 w% water in Examples VIII-IX.

The results are as follows:

TABLE

| Example | Permeate w % water | Flux kmh |
|---|---|---|
| II* | 2.2 | 4.83 |
| III* | 20.5 | 3.68 |
| IV | 82.2 | 2.71 |
| V | 90.4 | 2.02 |
| VI | 99.7 | 1.07 |
| VII | 98.1 | 1.19 |
| VIII | 95.8 | 0.73 |
| IX | 98.7 | 0.89 |

From Examples II*-IX, it may be seen that practice of the process of this invention permits attainment of a permeate containing ca 90-99.7 w% water.

EXAMPLES X-XVII

In this series of examples, the general procedure of Example I is followed except:

(i) In Control Examples X* and XIV*, the membrane is a polyvinyl alcohol membrane which has been cross-linked with maleic acid available from Gesellschaft fur Trenntechnique;

(ii) In Control Examples XI* and XV, the membrane is a prior art polyvinyl alcohol membrane which has been cross-linked with glutaraldehyde;

(iii) In Examples XII-XIII and XVI-XVII, the membrane is prepared as in Example I except that in Examples XII and XVI, the membrane wet thickness is 2 mil and in Examples XIII and XVII, the membrane wet thickness is 4 mil.

(iv) The membranes are formed from a solution containing 1 part of poly(4-vinyl pyridine) in methanol (25 w% solids) plus 1 part of n-butanol;

(v) the feed contains methyl ethyl ketone-toluene-and water with a weight ratio of methyl ethyl ketone: water of 2:1;

(vi) the water concentration is 1.9 w% in Examples X-XIII and 0.61 w% in Examples XIV-XV and 0.69 w% in Examples XVI-XVII.

(vii) Temperature of operation is 70° C.

TABLE

| Example | Permeate w % water | Flux kmh |
|---|---|---|
| X* | 99.9 | 0.27 |
| XI* | 99.9 | 0.23 |
| XII | 97.7 | 2.07 |
| XIII | 98.1 | 1.50 |

TABLE-continued

| Example | Permeate w % water | Flux kmh |
|---|---|---|
| XIV* | 99.4 | 0.006 |
| XV* | 99.8 | 0.004 |
| XVI | 91.8 | 0.59 |
| XVII | 99.3 | 0.36 |

From the above, it is apparent that the process of this invention permits attainment of permeate which contains water in concentration comparable to that attained with commercially available membranes—but at a flux which may be Ca 8 (2.07/0.23) to >100 times (0.59/0.004) higher.

Although this invention has been illustrated by reference to specific embodiments, it will be apparent to those skilled in the art that various charges and modifications may be made which clearly fall within the scope of the invention.

What is claimed is:

1. The method of separating water from a charge aqueous mixture of hydrocarbon and organic oxygenate which comprises maintaining a non-porous membrane separating layer of a poly(vinyl pyridine) which has been cross-linked with an aliphatic polyhalide;

maintaining a pressure drop across said non-porous separating layer;

passing a charge water-containing mixture of hydrocarbon and organic oxygenate into contact with the high pressure side of said non-porous separating layer whereby at least a portion of said water in said charge aqueous mixture and a lesser portion of hydrocarbon and organic oxygenate pass by pervaporation through said non-porous separating layer as a lean mixture containing more water and less hydrocarbon and organic oxygenate than are present in said charge aqueous mixture and said charge aqueous mixture is converted to a rich liquid containing less water and more hydrocarbon and organic oxygenate than are present in said charge aqueous mixture;

recovering from the low pressure side of said non-porous separating layer said lean mixture containing more water and less hydrocarbon and organic oxygenate than are present is aid charge aqueous mixture, said lean mixture being recovered in vapor phase at a pressure below the vapor pressure thereof; and recovering form the high pressure side of said non-porous separating layer said rich liquid containing a lower water content and a higher hydrocarbon and organic oxygenate content than are present in said charge aqueous mixture.

2. The method claimed in claim 1 wherein said non-porous separating layer is a homopolymer of 4-vinyl pyridine.

3. The method claimed in claim 1 wherein said non-porous separating layer is a homopolymer of 4-vinyl pyridine of molecular weight $\overline{M}_n$ of 10,000–500,000.

4. The method claimed in claim 1 wherein said non-porous separating layer is a copolymer of 4-vinyl pyridine and a ethylenically unsaturated monomer.

5. The method claimed in claim 1 wherein said non-porous separating layer is cross-linked with an aliphatic dihalide.

6. The method claimed in claim 1 wherein said non-porous separating layer is cross-linked with an aliphatic dihalide containing 2-10 carbon atoms.

7. The method claimed in claim 1 wherein said non-porous separating layer is cross-linked with a dibromobutane.

8. The method claimed in claim 1 wherein said hydrocarbon is toluene.

9. The method claimed in claim 1 wherein said organic oxygenate is methyl ethyl ketone.

10. The method claimed in claim 1 wherein said separating layer has a thickness of about 1-10 microns.

11. The method claimed in claim 1 wherein said poly(4-vinyl pyridine) which has been cross-linked is supported on a porous support layer.

12. The method in claim 11 wherein said porous support layer is a polyacrylonitrile polymer.

13. The method claimed in claim 11 wherein said porous support layer is a polyacrylonitrile polymer of molecular weight $\overline{M}_n$ of 100,000–300,000 and of molecular weight cut off of less than about 100,000.

14. The method of separating water from a charge aqueous mixture containing toluene and methyl ethyl ketone which comprises maintaining a non-porous membrane separating layer of poly(4-vinyl pyridine) which has been cross-linked with dibromobutane in the presence of acid catalyst;

maintaining a pressure drop across said non-porous separating layer;

passing a charge aqueous mixture of toluene and methyl ethyl ketone into contact with the high pressure side of said non-porous separating layer whereby at least a portion of the water is said charge aqueous mixture and a lesser portion of toluene and methyl ethyl ketone pass by pervaporation through said non-porous membrane separating layer as a lean mixture containing more water and less toluene and methyl ethyl ketone than are present in said charge aqueous mixture and said charge aqueous mixture is converted to a rich liquid containing less water and more toluene and methyl ethyl ketone than are present in said charge aqueous mixture;

recovering from the low pressure side of said non-porous separating layer said lean mixture containing more water and less toluene and methyl ethyl ketone than are present in said charge aqueous mixture, said lean mixture being recovered in vapor phase at a pressure below the vapor pressure thereof; an recovering from the high pressure side of said non-porous separating layer said rich liquid containing a lower water content and a higher toluene and methyl ethyl ketone content than are present in said charge aqueous mixture.

* * * * *